United States Patent Office 2,871,995
Patented Feb. 3, 1959

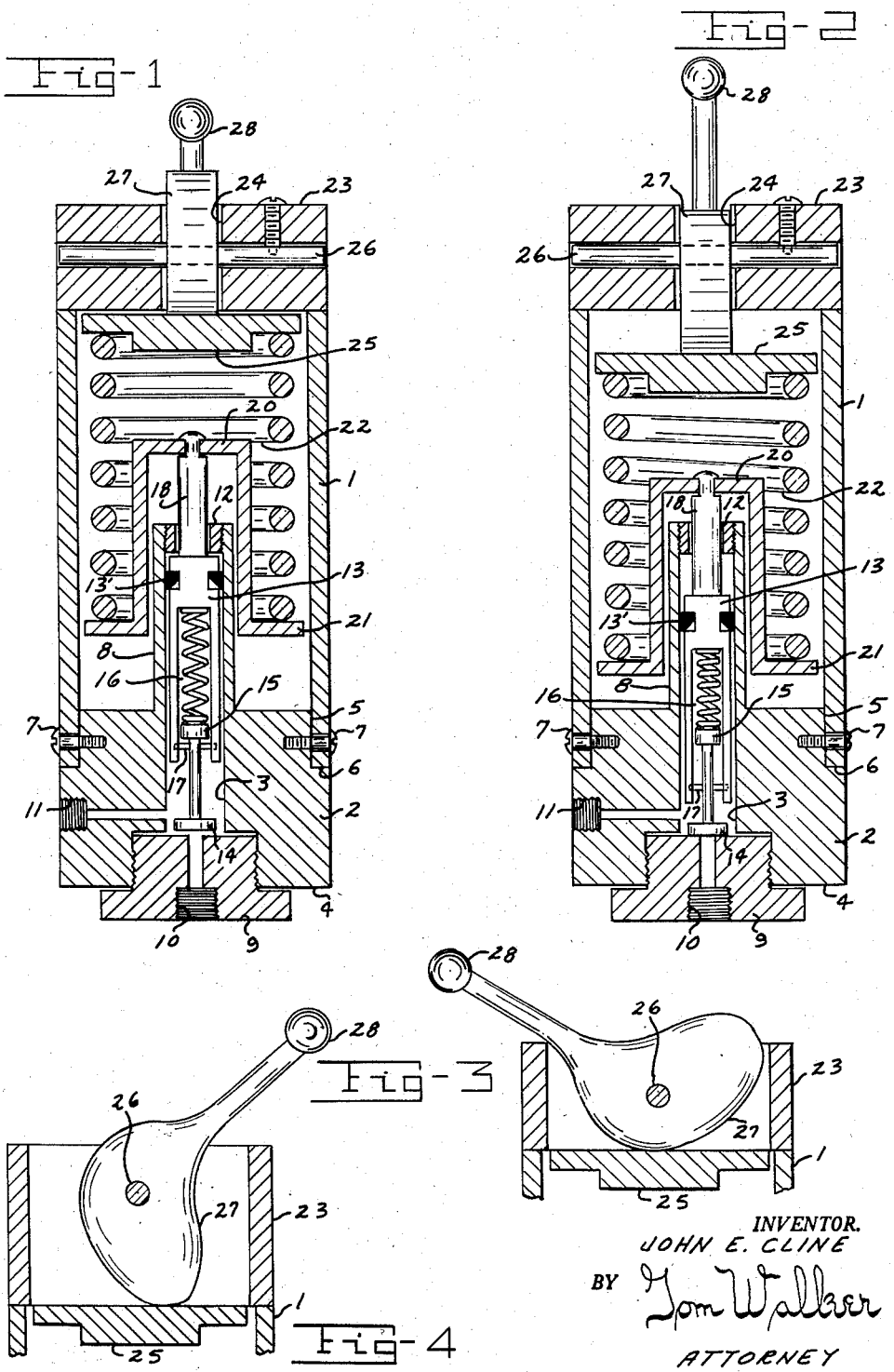

2,871,995
BRAKE LOCKING MECHANISM
John E. Cline, Alpha, Ohio
Application January 24, 1956, Serial No. 561,046
8 Claims. (Cl. 188—152)

This invention relates to brake locking mechanism and more particularly to an accumulative brake lock for use in the hydraulic brake systems of automotive vehicles. The invention is particularly intended for use on delivery trucks which are required to make frequent stops in their daily activity, for example, milk trucks.

The present invention provides an improved lock mechanism for hydraulic brakes which is actually incorporated in the normal brake system, being located in the supply line between the master cylinder and the individual brake lines. The mechanism functions to lock the brake lines after the foot brake is applied and accommodates an accumulation of braking fluid under pressure which functions to compensate for even minute leakage in the brake line during the braking period. No brake looseness or slippage will result in employing this compensating lock mechanism. The brake lock mechanism functions smoothly with the normal foot brake in the hydraulic brake system and can be thrown immediately prior to stopping the vehicle in which it is embodied. Once the foot brake is applied and released as the vehicle is stopped, the brake lock mechanism automatically takes over and maintains a positive brake lock.

The object of the invention is to simplify the construction as well as the means and mode of operation of brake locking mechanisms, whereby such mechanism may not only be economically manufactured, but will be more efficient and satisfactory in use, adaptable to a wide variety of applications, and be unlikely to get out of repair.

Referring to the drawing wherein is found one but obviously not necessarily the only form of embodiment of the invention, Fig. 1 is a cross-sectional view of the improved brake lock unit as provided by the invention, shown in unlocked condition;

Fig. 2 is a similar cross-sectional view of the apparatus shown in Fig. 1 but showing the components of the lock unit in their locking position;

Fig. 3 is a fragmentary view of the lock unit showing the cam control therefor in its unlocked position; and Fig. 4 is a fragmentary view similar to that of Fig. 3 but showing the control element in its locking position.

Like parts are indicated by similar characters of reference throughout the several views.

The invention can best be described with reference to the drawings. A cylindrical housing 1 is shown having a cylindrical adapter 2 seating in the lower end thereof and provided with a central aperture 3 therein. The adapter 2 has an outer end 4 which affords an extension of the housing 1. The adapter is reduced in diameter inwardly of its outer end at 5 providing a shoulder 6 thereon which abuts the lower end of the housing 1 as the adapter seats therein. The reduced portion 5 of the adapter 2 nests within the housing in sealing relation to its inner wall and is fixed therein by screws 7 engaging through the wall of the housing 1.

The innermost and upper end of the adapter within the housing is further reduced in diameter so as to provide a thin wall tubular extension 8 thereof. The aperture 3 in the adapter 2 is counterbored at the lower end thereof to receive a plug 9 threadedly engaged therein. The plug 9 is centrally apertured to provide an inlet 10 to the brake lock unit, suitable tubing interconnecting the inlet 10 and the master cylinder of the brake system in which the unit is incorporated. The outer end of the adapter is also provided with an outlet 11 in the side wall thereof opening from the central aperture 3 therein. This outlet is connected to the normal brake lines of the hydraulic braking system.

The upper end of the adapter's tubular extension 8 is internally threaded and has a centrally apertured bearing 12 engaged therein. Interiorly of the bearing 12 is a cup shaped piston 13 with its cup portion extending downwardly of the adapter. Supported within the piston in overlying relation to the inlet opening in the plug 9 is a valve 14. A valve stem extends upwardly therefrom within the cup portion of the piston 13 and is provided with a valve head 15 at the upper end thereof. A coil spring 16 seats in the cup portion of the piston 13 with its lower end in biasing contact with the valve head 15 to normally bias the valve 14 downwardly toward the inlet in the plug 9. A retaining ring 17 within the cup portion of the piston 13 retains the valve head within the piston limiting its downward movement. A cup seal 13' is seated about the piston 13 externally thereof adjacent its upper end for purposes to be described.

A contact rod 18 passes through the bearing 12 in the tubular extension of the adapter and seats against the piston 13. The upper projecting end of the contact rod is pinned centrally to a cylindrical cap 20 which nests about the tubular extension 8 of the adapter with the central cap portion vertically spaced relative thereto. The depending extremity of the cap 20 has a radially projecting flange 21 integral therewith. A coil spring 22 seats on the flange 21 and about the cap 20 and extends vertically of the housing 1.

In the upper end of the housing 1, and fixed thereto, is a cap 23 having a central slot 24. A follower plate 25 seats on the upper end of the spring 22 and is normally biased thereby into contact relation with the cap 23 on housing 1. A pin 26, extending transversely of the slot 24 in cap 23, pivotally mounts an eccentric cam 27. The cam surface thereof is in contacting relation with the follower plate 25 through the slot 24 in the cap 23. An operating lever 28 integrally connected to the cam 27 permits selective rotation thereof to a locked or unlocked position as will be described. A set screw 30 extends through the cap 23 to engage the pin 26 and fix its position therein.

The unit shown in Fig. 1 of the drawings is in an unlocked condition. As shown therein, the eccentric cam 27 is so disposed as to produce a minimum bias through the follower plate 25, spring 22, cap 20 and connected contact rod 18 to piston 13. The piston 13 is accordingly disposed in the upper portion of the tubular extension 8 of the adapter 2 and the bias of the spring 15 within the piston as applied to the valve head is ineffective to apply the valve 14 to close the inlet 10 from the master cylinder. Under such condition, the brakes may be applied through the normal foot brake as required and the pressure of the brake fluid from the master cylinder will pass through outlet 11 to the brake lines, and as the foot brake is released, and the braking pressure eliminated, the fluid returns to its source, in the conventional manner.

When, in the instance of frequent stops, it is desired to render the mechanism effective to maintain the brakes locked on braking, the lever 28 is operated to rotate the eccentric cam 27 to its position as shown in Fig. 4 of the drawings where it exerts maximum pressure through the follower plate 25 to lower the piston 13, and the valve 14 so as to seal the inlet 10 from the master cylinder. When the foot brakes are applied to stop the vehicle in which the system is incorporated, the pressure of the brake fluid resulting from the master cylinder is sufficient to overcome the bias of spring 16 and lift the valve to deliver the required excess braking fluid to initially apply the brakes, but as the foot brake is released, the valve positively seals the inlet and the brake lock unit takes over.

The interior of the tubular extension 8 about the piston as far as the cup seal thereabout is normally filled with braking fluid. As the foot brake is released and the inlet is sealed, the fluid is trapped in the lines by closing of valve 14 and holds the brakes in locked engagement. Should there be a slight leakage in the brake lines, the bias of spring 22 is sufficient to continue to lower the piston through the cap 20 and add additional braking fluid from the reservoir 8 to the brake lines as required. Any slippage or looseness of the brakes resulting from minute leakage is thereby eliminated.

When the driver of the vehicle is ready to start again, he need only rotate the lever 28 to place the cam 27 in its unlocked position, releasing the pressure on spring 22 and the piston 13 thereby. The fluid pressure in the brake lines is then sufficient to raise the piston 13 and the connected cap 20 to its uppermost position. This lifts valve 14 opening the inlet 10 and the brake fluid from the brake lines returns to the master cylinder through the inlet 10 in the conventional manner.

The above function of the brake lock mechanism has been described with reference to a condition where the driver throws the control cam 27 to its locking position immediately prior to stopping the vehicle by his foot brake, whereby on stopping and release of the foot brake, the mechanism automatically takes over its brake locking function. If desired, the driver can also apply the locked position to the cam 27 after he has already braked to a stop and the brake lock mechanism will then function to seal the valve 14 over the inlet and operate as indicated above to hold the brakes locked and compensate automatically in the event of leakage or slippage.

From the above description it will be readily apparent that there is thus provided a device of the character described possessing the particular features of advantage before enumerated as desirable, but which is obviously susceptible of modifications in its form, proportions, detail construction and arrangement of parts without departing from the principle involved or sacrificing any of its advantages.

While in order to comply with the statute, the invention has been described in langauge more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An accumulative brake lock for hydraulic brakes comprising, a housing, means in said housing affording an inlet thereto from a master cylinder, means providing an outlet from said housing in communication with said inlet for delivery of braking fluid to the brake lines, means in said housing operative to close said inlet but responsive to delivery of braking fluid thereto under pressure to provide access to said outlet for delivery of said fluid under pressure to said brake lines for applying the brakes, said means including self adjusting pressure means providing a constant pressure head of braking fluid in said housing and at said outlet compensating for any leakage in the brake lines during the braking period whereby the brakes are maintained in a positive locked condition once the brakes are applied.

2. A brake lock mechanism for hydraulic brakes comprising, a housing, passage therein, means defining an inlet to and outlet from said passage respectively providing an inlet from a master cylinder and an outlet from said housing to the brake lines, a valve in said passage overlying said inlet in normally biased relation thereto, first biasing means in said passage connected to said valve and having a sealing element thereabout sealingly engaging the wall of said passage in spaced relation to said inlet and outlet, further biasing means in said housing superimposed on said first biasing means, and lock means connected to said housing and operative on said further biasing means to apply pressure on said valve means to seal said valve to said inlet and provide a pressure head within said tubular passage to maintain the brakes in a locked condition, and in the event of leakage in the brake lines, said further biasing means becomes operative to induce fluid under pressure to the brake lines to compensate for the leakage and maintain the braking pressure required.

3. A brake lock for hydraulic brakes comprising, a housing including a centrally apertured bottom closure element providing an inlet for connection to a master brake cylinder, and a lateral aperture from said central aperture for connection to the brake lines, a valve means mounted in said central aperture including a valve biased toward said inlet, a cup seal thereabout providing a seal with the wall defining said central aperture, and lock means connected to said housing and operable on said valve means to close said inlet whereby a pocket of fluid is effected in said housing between said cup seal and the outlet, the lock means including biasing means coaxial with said valve means applying continuous pressure to said pocket of fluid through said cup seal effecting a pressure head at said outlet insuring compensation for any leakage in the brake line during the braking period.

4. A brake lock mechanism comprising, a housing, means in said housing defining an inlet thereto and an outlet therefrom, a valve in said housing normally biased toward said inlet, means within said housing operatively engaging said valve and adjustable to move said valve into sealing engagement with said inlet, whereby braking fluid under pressure may be introduced in said inlet to lift the valve and pass through said outlet to brake lines associated therewith, and on release of the braking pressure on the braking fluid, said valve will again seal the inlet, and a plunger element in said valve engaging means operable on sealing of said inlet to maintain brake fluid under pressure to said brake lines, thereby locking the brakes associated therewith and self adjusting biasing means acting on said plunger element and compensating for leakage in the brake lines so as to maintain the brakes in their locked condition.

5. A brake lock mechanism for a hydraulic brake system comprising, a housing having means therein for connection respectively to a master cylinder and to the brake lines for transmission of braking fluid therethrough, a valve in said housing, means connected with said valve and operative to block the transmission of braking fluid through said housing by interposing said valve in said transmission means, said means connected with said valve including a piston operative on the brake fluid in said housing on the brake line side of said valve as it blocks said transmission means to force the fluid into the brake lines under pressure to lock the brakes until said means operatively connected with said valve are operated to release said valve whereupon pressure in the brake lines will cause displacement of said valve and the excess brake fluid in the brake lines will be returned through said housing to the master cylinder, said piston having self adjusting means connected therewith to automatically adjust said piston to compensate for loss of fluid in the brake lines.

6. A brake lock mechanism for hydraulic brakes comprising, a housing, means connected to said housing at one end thereof affording an inlet and outlet thereto, the inlet being adapted for connection to a master cylinder and the outlet for connection to the brake lines, a passage in said means connected to said housing and connected into said inlet and outlet, a piston mounted in said passage and having a valve therein normally biased toward said inlet, a floating plate element overlying said passage within said housing and having a spring seated thereon, a floating follower plate seated on said spring, said plate element having a contact element connected thereto and extending within said passage in contacting biasing relation to said piston under the influence of said spring, and means pivotally connected to said housing and operatively engaging said follower plate for applying pressure thereto and depressing said piston through said contact element to seal the valve over said inlet after braking, said piston having means thereabout in sealing relation to the wall of said passage effecting a fluid pocket in communication with said outlet, whereby on depressing said piston a substantial pressure head is produced on the fluid in said passage in communication with the brake lines compensating for any loss of brake fluid in the brake lines in the event of leakage therefrom, said valve opening in response to a predetermined pressure at said inlet.

7. A brake lock mechanism for hydraulic brakes comprising, a housing, means connected in said housing affording an inlet and outlet thereto, the inlet being adapted for connection to a master cylinder and the outlet for connection to the brake lines, a tubular element in said means connected to said housing and opening into said inlet and outlet, a piston mounted in said tubular element, a valve aligned with said piston in overlying relation to said inlet and normally biased to close said inlet, said valve opening in response to a predetermined pressure at said inlet, a compression spring interposed between said piston and said valve, a plate element mounted in said housing and overlying said tubular element therein, biasing means connected in biasing relation to said plate element, said plate element having means connected thereto extending into said tubular element in contacting biasing relation to said piston under the influence of said biasing means, and a control arm having a control cam eccentrically pivoted to said housing and operatively connected to said biasing means for applying pressure thereto to depress said piston in said tubular element and seal the valve to said inlet, said piston having a cup seal fixed thereabout in sealing relation to the inner wall of said tubular element effecting a tubular pocket thereabout in communication with said outlet whereby on braking and said control cam being operated to depress said piston, a pressure head is produced in said pocket providing a compensating head of brake fluid which delivers additional brake fluid to said brake lines, in event of leakage therein, under the influence of said biasing means.

8. A brake lock mechanism for hydraulic brakes comprising, a housing, means connected thereto providing an inlet and outlet thereto, the inlet being adapted for connection to a master cylinder and the outlet for connection to the brake lines, means defining a passage in said means connected to said housing and connecting with said inlet and said outlet, valve means mounted in said passage and overlying said inlet, floating biasing means overlying said passage and mounted within said housing and having a contact element extending within said passage, spring means interposed between said contact element and said valve means, a sealing element on said contact element in slidable sealing relation to the wall of said passage, a fluid pocket therein in communication with said outlet, said floating biasing means applying through said spring means, a bias to said valve means to seat it to said inlet, and manual means mounted to said housing and adjustable relative thereto to increase the applied bias of said biasing means to said valve means to seal it to said inlet, whereby, on braking, said valve means will permit passage of braking fluid to the brake lines and immediately and positively seal said inlet, said biasing means affecting a substantial continuous pressure head on the fluid in said pocket in communication with said brake lines preventing leakage therefrom back through said housing and insuring a pressurized flow of brake fluid to said brake lines to compensate in the event of leakage therefrom.

References Cited in the file of this patent

UNITED STATES PATENTS

| | | |
|---|---|---|
| 2,218,191 | Dick | Oct. 15, 1940 |
| 2,307,644 | Schlumbrecht et al. | Jan. 5, 1943 |
| 2,445,855 | Majneri | July 27, 1948 |
| 2,466,224 | Frank et al. | Apr. 4, 1949 |
| 2,467,887 | Gladden | Apr. 19, 1949 |
| 2,572,190 | Patrick | Oct. 23, 1951 |